(12) United States Patent
Nagai et al.

(10) Patent No.: US 8,631,703 B2
(45) Date of Patent: Jan. 21, 2014

(54) SENSOR

(75) Inventors: Nobuyuki Nagai, Kanagawa (JP);
Yusaku Kato, Tokyo (JP)

(73) Assignee: Sony Corporation, Tokyo (JP)

( * ) Notice: Subject to any disclaimer, the term of this patent is extended or adjusted under 35 U.S.C. 154(b) by 185 days.

(21) Appl. No.: 13/017,212

(22) Filed: Jan. 31, 2011

(65) Prior Publication Data

US 2011/0192228 A1 Aug. 11, 2011

(30) Foreign Application Priority Data

Feb. 5, 2010 (JP) ................................ P2010-024391

(51) Int. Cl.
*G01P 15/08* (2006.01)

(52) U.S. Cl.
USPC ..................... 73/514.16; 73/514.02

(58) Field of Classification Search
USPC ...................... 73/510, 514.02, 514.16, 514.34
See application file for complete search history.

(56) References Cited

U.S. PATENT DOCUMENTS

| | | | |
|---|---|---|---|
| 4,996,878 A | * | 3/1991 | Kubler ............................. 73/510 |
| 5,452,612 A | * | 9/1995 | Smith et al. ................ 73/514.34 |

FOREIGN PATENT DOCUMENTS

| | | |
|---|---|---|
| JP | 05-133974 | 5/1993 |
| JP | 07-159433 | 6/1995 |
| JP | 2000-171480 | 6/2000 |
| JP | 2002-107374 | 4/2002 |
| JP | 2005-39995 | 2/2005 |
| JP | 4004129 | 8/2007 |
| JP | 2008-304390 | 12/2008 |
| JP | 2010-014406 | 1/2010 |

OTHER PUBLICATIONS

Japanese Office Action issued Jul. 9, 2013 for corresponding Japanese Appln. 2010-024391.

* cited by examiner

*Primary Examiner* — John Chapman, Jr.
(74) *Attorney, Agent, or Firm* — K&L Gates LLP

(57) ABSTRACT

A sensor includes: a first polymer sensor element generating a first voltage corresponding to a deformation thereof; a second polymer sensor element generating a second voltage corresponding to a deformation thereof; a fixing member fixing a first end of each of the first and the second polymer sensor elements while electrically insulating the first ends from each other; and a detector detecting an acceleration and an angular acceleration based on the first voltage derived from the first polymer sensor element and the second voltage derived from the second polymer sensor element.

6 Claims, 7 Drawing Sheets

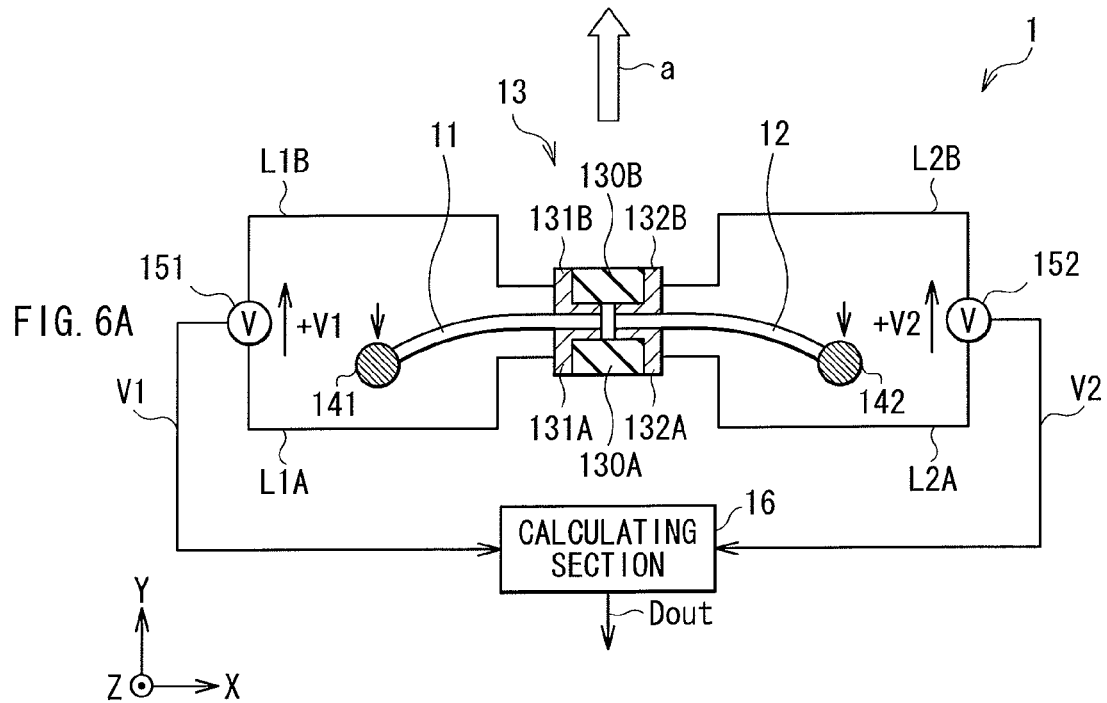
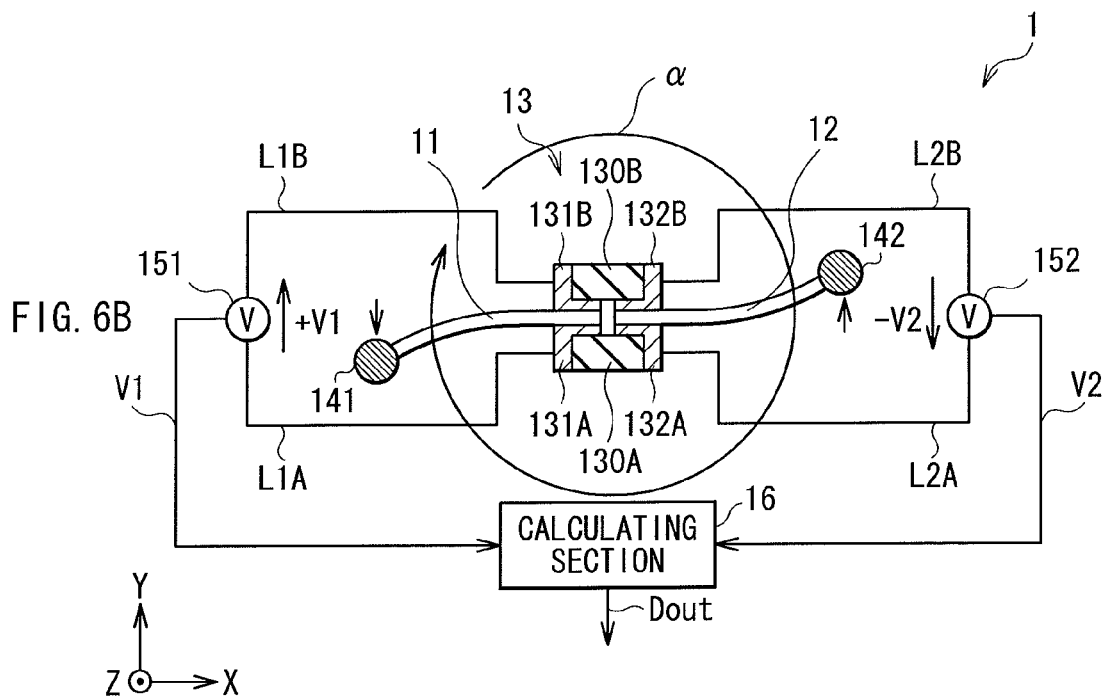

SENSOR

CROSS REFERENCES TO RELATED APPLICATIONS

The present application claims priority to Japanese Priority Patent Application JP 2010-024391 filed in the Japan Patent Office on Feb. 5, 2010, the entire content of which is hereby incorporated by reference.

BACKGROUND

The invention relates to a sensor which detects a motion parameter such as acceleration using a polymer sensor element.

A sensor or a "motion sensor", such as an acceleration sensor and an angular acceleration sensor, has been used in various electronic devices such as mobile phones and gaming consoles. A variety of schemes have been proposed for the motion sensor. Examples of such include: a scheme in which force is generated based on acceleration applied to a weight to detect the force with a voltage element such as a piezoelectric body; and a scheme in which an elastic body is deformed with generated force to detect the deformation of the elastic body as a change in capacitance, or to detect the same using a strain gauge.

Japanese Patent No. 4004129 (JP4004129B) proposes a motion sensor, which arranges the sensor elements, each utilizing the piezoelectric body, in a cross-configuration to be able to detect both the accelerations in biaxial directions and angular accelerations in triaxial directions. Japanese Unexamined Patent Application Publication No. 2005-39995 (JP2005-39995A) and No. 2008-304390 (JP2008-304390A) each propose to apply a bending sensor or a "displacement sensor" which utilizes a polymer sensor element to the acceleration sensor or the like.

SUMMARY

A motion sensor according to JP4004129B is disadvantageous, in that it is necessary to use a plurality of materials to form fine patterns, and thus it is difficult to manufacture due to its complex structure. Also, the motion sensor of JP4004129B utilizes a piezoelectric body made of ceramic that is difficult to process, making it more difficult to form such a structure. The use of the ceramic also leads to a disadvantage, in that the ceramic is fragile to an applied impact. The structure becomes further complex when the number of axes detectable is increased. In particular, the structure (or a circuit configuration) becomes even more complex in order to detect angular acceleration based on rotational motion, since it is necessary to stop oscillation of the sensor element in the detection thereof.

A displacement sensor structured by a polymer sensor element and having a structure of JP2005-39995A or JP2008-304390A is, in principle, unable to distinguish between linear motion and rotational motion, and thus has a drawback that the acceleration and the angular acceleration are not distinguished in detection.

For these and like reasons, what is desired is a sensor or a motion sensor, which is capable of detecting a wide variety of motion parameters such as, but not limited to, both the acceleration and the angular acceleration, with a simple configuration.

It is desirable to provide a sensor capable of detecting a wide variety of motion parameters with a simple configuration.

A sensor according to an embodiment includes: a first polymer sensor element generating a first voltage corresponding to a deformation thereof; a second polymer sensor element generating a second voltage corresponding to a deformation thereof; a fixing member fixing a first end of each of the first and the second polymer sensor elements while electrically insulating the first ends from each other; and a detector detecting an acceleration and an angular acceleration based on the first voltage derived from the first polymer sensor element and the second voltage derived from the second polymer sensor element.

In the sensor according to the embodiment, the first ends of the first and the second polymer sensor elements are fixed while being electrically insulated from each other. Thereby, when the acceleration derived from linear motion along a certain axial direction of the sensor itself is generated, the first and the second polymer sensor elements deform respectively in the same direction, so that the voltages having the same polarity to each other are generated from the first and the second polymer sensor elements. On the other hand, when the angular acceleration derived from rotational motion around a certain axial direction of the sensor itself is generated, the first and the second polymer sensor elements deform respectively in opposite directions to each other, so that the voltages having different polarities to each other are generated from the first and the second polymer sensor elements. Such a difference in combination of the polarities of the voltages between the generation of the acceleration and the generation of the angular acceleration is utilized, to thereby make it possible to distinguish between the acceleration and the angular acceleration in detection based on the first voltage derived from the first polymer sensor element and the second voltage derived from the second polymer sensor element.

According to the sensor of the embodiment, the first ends of the first and the second polymer sensor elements are fixed while being electrically insulated from each other, and the acceleration and the angular acceleration are detected based on the first voltage derived from the first polymer sensor element and the second voltage derived from the second polymer sensor element. This makes it possible to distinguish between the acceleration and the angular acceleration in detection without using a complex structure unlike in currently-available techniques. Therefore, it is possible to detect a wide variety of motion parameters with a simple configuration.

Additional features and advantages are described herein, and will be apparent from the following Detailed Description and the figures.

BRIEF DESCRIPTION OF THE FIGURES

FIGS. 6A and 6B are schematic drawings for describing an operation of the motion sensor illustrated in FIG. 1.

DETAILED DESCRIPTION

The present application will be described in detail with reference to the accompanying drawings, according to an embodiment. The description will be given in the following order.

1. Embodiment: an embodiment in which uniaxial acceleration and uniaxial angular acceleration are detected with a pair of polymer sensor elements.
2. Modifications
First Modification: a modification of the embodiment in which triaxial accelerations and triaxial angular accelerations are detected with four pairs of polymer sensor elements.
Second Modification: a modification of the embodiment in which the triaxial accelerations and the triaxial angular accelerations are detected with two pairs of polymer sensor elements.

[Embodiment]
[Configuration of Motion Sensor 1]

Figure 1:
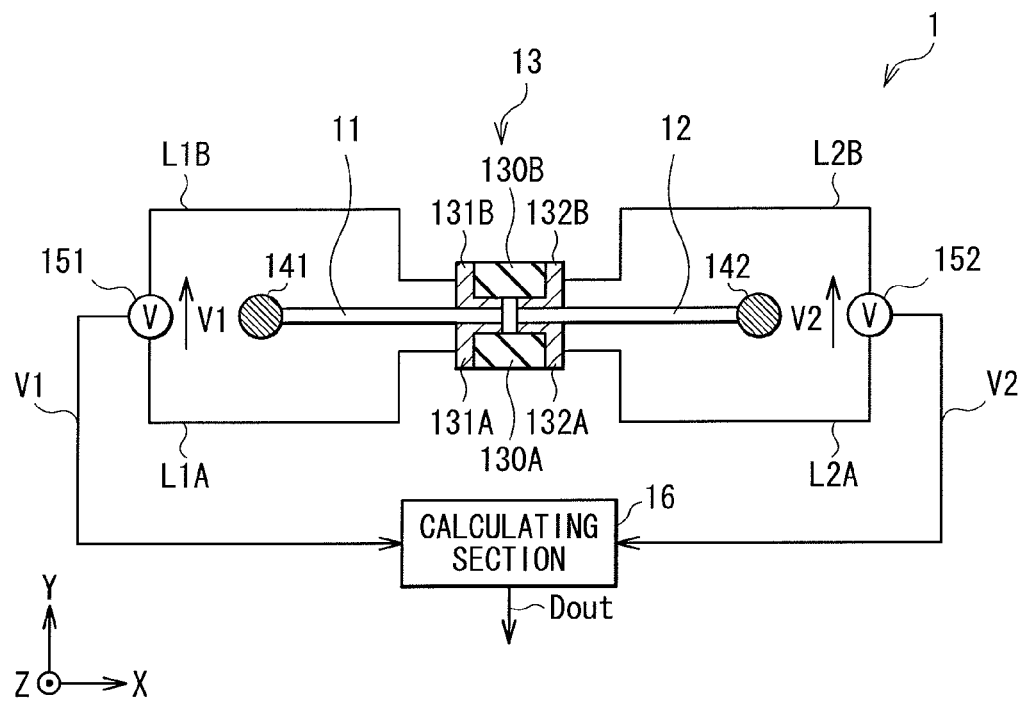
FIG. 1 schematically illustrates an outline of a configuration of a motion sensor according to an embodiment of the invention.
Figure 2:
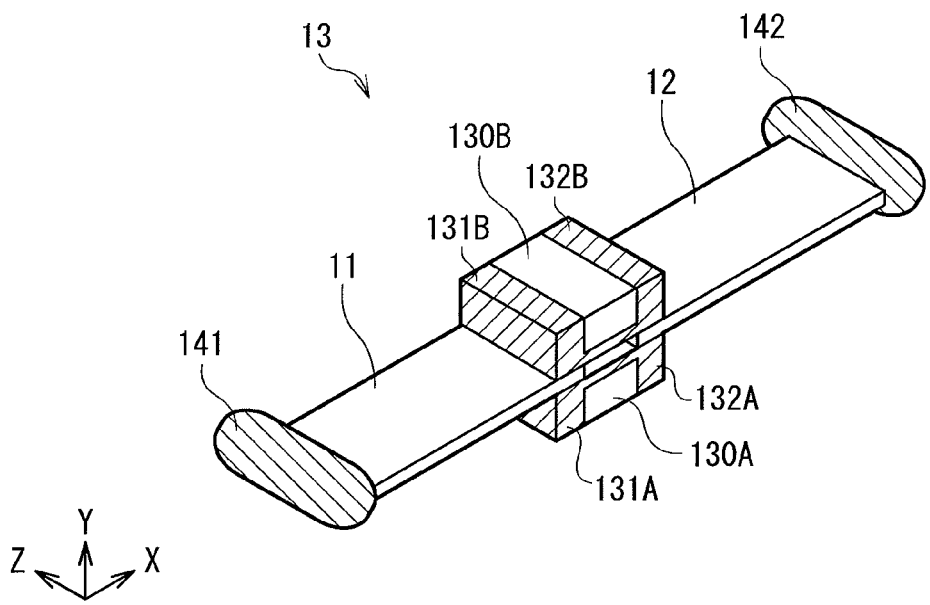
FIG. 2 is a perspective view illustrating a part of the motion sensor illustrated in FIG. 1 in an enlarged fashion.

FIG. 1 schematically illustrates an outline of a configuration of a sensor or a "motion sensor 1" according to an embodiment of the invention. FIG. 2 illustrates a part of the motion sensor 1 in an enlarged fashion as viewed from an angle. The motion sensor 1 is capable of detecting both acceleration "a" derived from linear motion along an uniaxial (Y-axis) direction and angular acceleration "α" derived from rotational motion (rotational motion in an X-Y plane) around one axis (Z-axis), as will be described later in detail. The motion sensor 1 is provided with a pair of polymer sensor elements 11 and 12, a fixing member 13, a pair of weights 141 and 142, a pair of voltage detecting sections 151 and 152, and a calculating section 16. The voltage detecting sections 151 and 152 and the calculating section 16 correspond to an illustrative example of "a detector" according to the embodiment of the invention.

The polymer sensor elements 11 and 12 generate voltages (electromotive force) V1 and V2, respectively, in response to deformation (or curvature, i.e., an amount of deformation and a direction of deformation) thereof due to the acceleration "a" or the angular acceleration "α" caused by its own motion (the linear motion or the rotational motion) of the motion sensor 1. As illustrated in FIG. 2, each of the polymer sensor elements 11 and 12 may have a strip-shaped or a rectangular thin-film configuration, for example. A detailed configuration of the polymer sensor elements 11 and 12 will be described later with reference to FIGS. 3 and 4.

The fixing member 13 serves to fix respective first ends of the polymer sensor elements 11 and 12 while electrically insulating those first ends from each other. In this embodiment, the polymer sensor elements 11 and 12 are respectively so fixed to the fixing member 13 as to protrude from the fixing member 13 in two directions on an X-axis around the fixing member 13. The fixing member 13 includes insulating sections 130A and 130B, fixed electrodes 131A and 131B, and fixed electrodes 132A and 132B. The fixed electrode 131A is connected to a back side (a face located on a negative direction side on the Y-axis) of the polymer sensor element 11, and the fixed electrode 131B is connected to a front side (a face located on a positive direction side on the Y-axis) of the polymer sensor element 11. The fixed electrode 132A is connected to a back side (a face located on the negative direction side on the Y-axis) of the polymer sensor element 12, and the fixed electrode 132B is connected to a front side (a face located on the positive direction side on the Y-axis) of the polymer sensor element 12. The insulating section 130A is provided between the fixed electrodes 131A and 132A, and serves to electrically insulate them from each other. Similarly, the insulating section 130B is provided between the fixed electrodes 131B and 132B, and serves to electrically insulate them from each other. Each of the fixed electrodes 131A, 131B, 132A, and 132B is configured of a metal material, which can be a gold-plated stainless steel (SUS) or other suitable metal material. Each of the insulating sections 130A and 130B is configured of an insulating material, which can be acrylonitrile butadiene styrene (ABS), an acrylic material, polycarbonate (PC), polypropylene (PP), polyethylene (PE), polystyrene (PS), polyacetal (POM), Nylon (Registered Trade Mark), polybutylene terephthalate (PBT), polyphenylene sulfide (PPS), polyether ether ketone (PEEK (Registered Trade Mark)), or other suitable insulating material.

The weight 141 is attached to a second end of the polymer sensor element 11, whereas the weight 142 is attached to a second end of the polymer sensor element 12. Each of the weights 141 and 142 is configured of a heavy metal such as, but not limited to, iron (Fe), lead (Pb), silver (Ag), copper (Cu), cobalt (Co), nickel (Ni), molybdenum (Mo), and tungsten (W), or configured of a resin material containing one or more of the heavy metals. The weights 141 and 142 serve to increase force (moment of inertia) applied to the polymer sensor elements 11 and 12, respectively, by the own linear motion or the own rotational motion of the motion sensor 1 described above.

The voltage detecting section 151 serves to detect a voltage V1 (a first voltage) generated in the polymer sensor element 11 through the fixed electrodes 131A and 131B and wirings L1A and L1B. The voltage detecting section 151 has a first end connected to the fixed electrode 131A through the wiring L1A, and a second end connected to the fixed electrode 131B through the wiring L1B. The voltage detecting section 152 serves to detect a voltage V2 (a second voltage) generated in the polymer sensor element 12 through the fixed electrodes 132A and 132B and wirings L2A and L2B. The voltage detecting section 152 has a first end connected to the fixed electrode 132A through the wiring L2A, and a second end connected to the fixed electrode 132B through the wiring L2B.

The calculating section 16 obtains or calculates each of the acceleration "a" and the angular acceleration "α" described above based on the voltage V1 detected in the voltage detecting section 151 and the voltage V2 detected in the voltage detecting section 152, and outputs the obtained acceleration "a" and the obtained angular acceleration "α" to the outside as detection data Dout. In one embodiment, as will be described later in greater detail, the calculating section 16 detects the acceleration "a" based on a sum of the voltage V1 and the voltage V2 (V1+V2), and detects the angular acceleration "α" based on a difference between the voltage V1 and the voltage V2 (V1−V2).

[Detailed Configuration of Polymer Sensor Elements 11 and 12]

Figure 3:
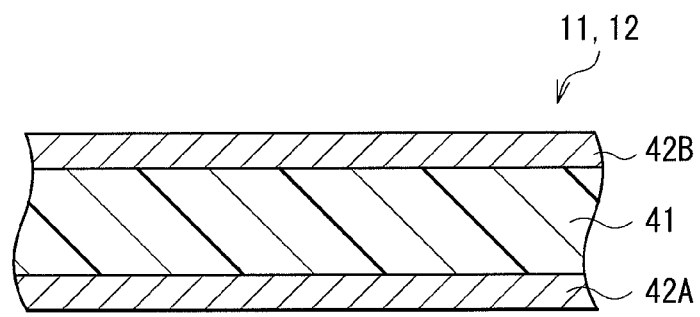
FIG. 3 is a cross-sectional view illustrating a detailed configuration of a polymer sensor element illustrated in FIGS. 1 and 2.
Figure 4:
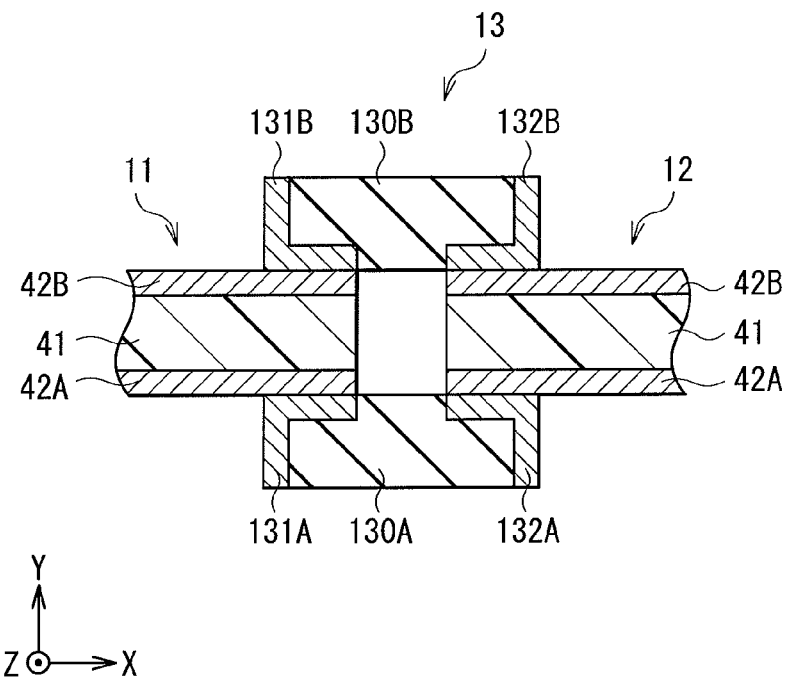
FIG. 4 is a cross-sectional view illustrating a detailed configuration in the vicinity of a fixing member illustrated in FIGS. 1 and 2.

The detailed configuration of the polymer sensor elements 11 and 12 will now be described with reference to FIGS. 3 to 5. FIG. 3 illustrates a cross-sectional configuration of the polymer sensor elements 11 and 12. FIG. 4 illustrates the cross-sectional configurations of the polymer sensor elements 11 and 12 together with a cross-sectional configuration of the fixing member 13.

As illustrated in FIG. 3, each of the polymer sensor elements 11 and 12 has a stacked structure in which a pair of electrode films 42A and 42B are attached to either surface of an ion-conductive highly-polymerized compound film 41 (hereinafter simply referred to as a "highly-polymerized compound film 41"). In other words, each of the polymer sensor elements 11 and 12 has the pair of electrode films 42A and 42B, and the highly-polymerized compound film 41 inserted between those electrode films 42A and 42B. In the polymer sensor element 11, the electrode film 42A is electrically connected to the fixed electrode 131A of the fixing member 13, while the electrode film 42B is electrically connected to the fixed electrode 131B of the fixing member 13, as illustrated in FIG. 4. In the polymer sensor element 12, the electrode film 42A is electrically connected to the fixed electrode 132A of the fixing member 13, while the electrode film 42B is electrically connected to the fixed electrode 132B of the fixing member 13.

The highly-polymerized compound film 41 is substituted by a cation, or is impregnated with a cation substance. As used herein, the term "cation substance" refers to a substance which includes the cation and a polar solvent, or a substance which includes a liquid cation. The substance including the cation and the polar solvent can be a substance in which the cation is solvated in the polar solvent, for example. The liquid cation can be a cation structuring an ionic liquid, for example. The substance including the liquid cation can be an ionic liquid, for example.

A material structuring the highly-polymerized compound film 41 can be an ion-exchange resin having, as a skeleton, a fluorine resin or a hydrocarbon system, for example. The ion-exchange resin can be an anion-exchange resin, a cation-exchange resin, or an anion-cation-exchange resin, for example. Among these ion-exchange resins, the cation-exchange resin is preferable, although it is not strictly necessary.

The cation-exchange resin can be a material introduced with an acidic group such as, but not limited to, a sulfonic acid group and a carboxyl group. The material can be polyethylene having an acidic group, polystyrene having the acidic group, a fluorine resin having the acidic group, or other suitable material. Among these materials, a fluorine resin having the sulfonic acid group or a carboxylic acid group is preferable, and Nafion (Registered Trade Mark, commercially available from DuPont, Wilmington, Del.) is particularly preferable, although they are not strictly necessary.

It is preferable, but not strictly necessary, that the cation substituted in the highly-polymerized compound film 41 be a metal ion or an organic cation. It is preferable, but not strictly necessary, that the cation substance impregnated in the highly-polymerized compound film 41 be a material which includes the metal ion and water, a material which includes the organic cation and water, or the ionic liquid. The metal ion can be a light metal ion such as, but not limited to, sodium ion ($Na^+$), a potassium ion ($K^+$), a lithium ion ($Li^+$), and a magnesium ion ($Mg^{2+}$). The organic cation can be an alkylammonium ion, for example. When the cation substance including the cation and the water is impregnated in the highly-polymerized compound film 41, it is preferable, but not strictly necessary, that the polymer sensor elements 11 and 12 are respectively sealed as a whole in order to suppress evaporation of water.

The ionic liquid may sometimes be referred to as an ambient temperature molten salt, and includes a cation and an anion having a fire-retardant property and low volatility. The ionic liquid can be a compound such as, but not limited to, an imidazolium ring based compound, a pyridinium ring based compound, or an aliphatic based compound.

Each of the electrode films 42A and 42B includes one or more kinds of conductive materials. It is preferable, but not strictly necessary, that each of the electrode films 42A and 42B be a film in which conductive material powders are mutually bonded through a conductive polymer, since this increases flexibility of the electrode films 42A and 42B. The conductive material power is preferably a carbon powder, since the carbon powder is high in conductivity and high in specific surface area so that a larger amount of deformation is obtained, although it is not strictly necessary. The carbon powder is preferably KetjenBlack (Registered Trade Mark), although it is not strictly necessary. The conductive polymer is preferably a material which is similar to the material structuring the highly-polymerized compound film 41 described above, although it is not strictly necessary.

The electrode films 42A and 42B may be formed by applying a coating material, having the conductive material powder and the conductive polymer that are dispersed in a dispersion medium, to either surface of the highly-polymerized compound film 41, and then drying the same, for example. Alternatively, a film-like member including the conductive material powder and the conductive polymer may be pressure-bonded to either side of the highly-polymerized compound film 41.

Each of the electrode films 42A and 42B may have a multilayer structure. In one embodiment where the electrode films 42A and 42B each have the multilayer structure, it is preferable, but not strictly necessary, that the electrode films 42A and 42B each have a stacked configuration including: a layer in which the conductive material powders are mutually bonded through the conductive polymer; and a metal layer, since this allows an electric potential to approach a more uniform value in an in-plane direction of each of the electrode films 42A and 42B, and enables to achieve better sensor characteristics. A material structuring the metal layer can be a precious metal such as, but not limited to, gold and platinum. A thickness of the metal layer is optional, although the metal layer is preferably, but not strictly necessary, a continuous film such that the potential becomes uniform in each of the electrode films 42A and 42B. A method of forming the metal film can be a plating method, a vapor deposition method, a sputtering method, or other suitable method.

In one embodiment where the substance including the cation and the polar solvent is used for the cation substance in each of the polymer sensor elements 11 and 12, almost no anion is included in the highly-polymerized compound film 41.

With this configuration, the voltage (the electromotive force) is generated between the electrode film 42A and the electrode film 42B when the highly-polymerized compound film 41 is deformed or bent in a direction orthogonal to a film plane (in the Y-axis direction in this embodiment) in each of the polymer sensor elements 11 and 12, as will be described later in greater detail. In one embodiment, either surface of each of the polymer sensor elements 11 and 12 may be covered with an unillustrated insulating protective film configured of a highly-elastic material, which can be polyurethane or other suitable material. A size including a width and a length of the highly-polymerized compound film 41 is optional and may be set on an as-needed basis, depending on the estimated or predetermined amount of deformation (or a displacement amount) of the highly-polymerized compound film 41.

[Basic Operation of Polymer Sensor Elements 11 and 12]

Figure 5A:
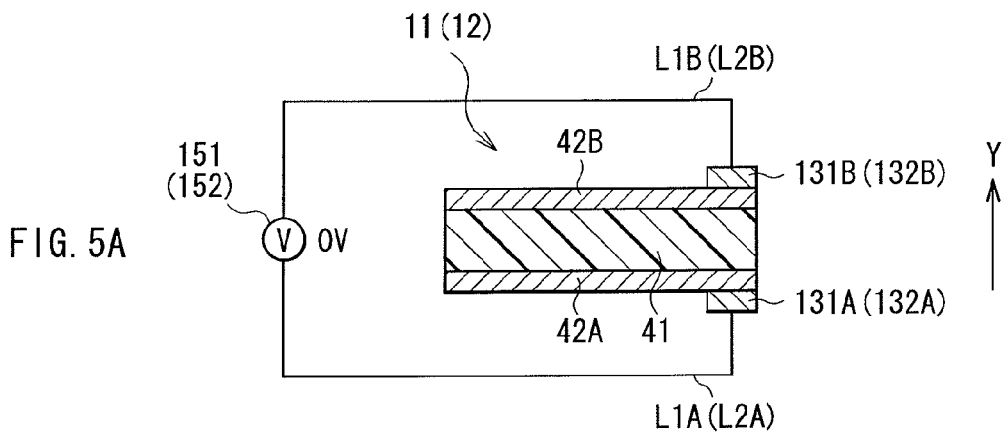
FIGS. 5A to 5C are schematic cross-sectional views for describing a basic operation of the polymer sensor element.
Figure 5B:
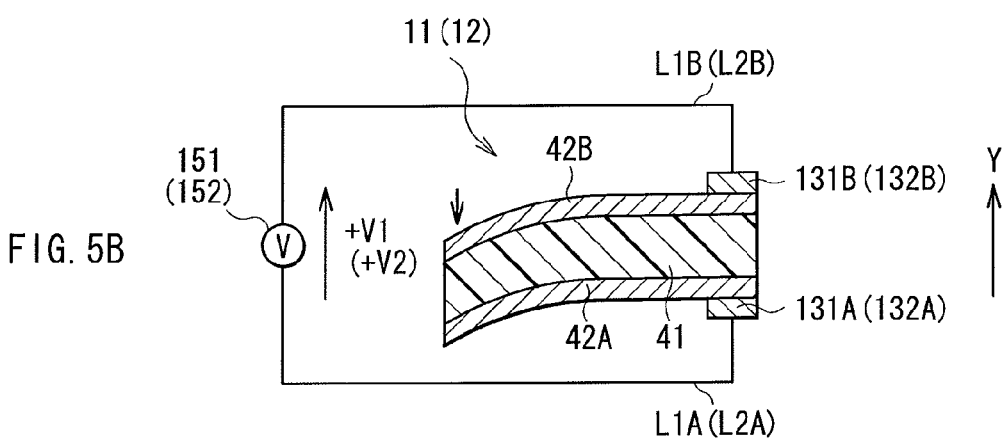
Figure 5C:
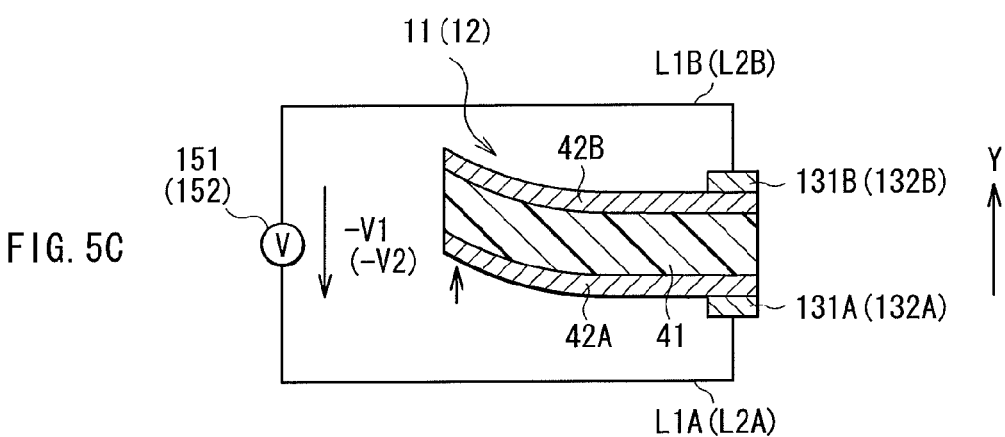

A basic operation of the polymer sensor elements 11 and 12 having the configuration described above will now be described with reference to FIGS. 5A to 5C. FIGS. 5A to 5C are cross-sectional views schematically illustrating the basic operation of the polymer sensor elements 11 and 12.

First, one embodiment will be described where the highly-polymerized compound film 41 includes the cation and the polar solvent for the cation substance.

When there is no linear motion nor the rotational motion in the motion sensor 1 itself, both the acceleration "a" and the angular acceleration "α" are not generated, and the force arises therefrom is not applied in each of the polymer sensor elements 11 and 12. Each of the polymer sensor elements 11 and 12 is thus in a planar state without causing deformation or bending, as illustrated in FIG. 5A. Thereby, the cation substances are dispersed substantially uniformly in the highly-polymerized compound film 41. Hence, a potential difference (i.e., the voltage V1 or the voltage V2) is not generated between the electrode film 42A and the electrode film 42B, and the voltages detected by the voltage detecting sections 151 and 152 are at zero volts.

When there is the linear motion or the rotational motion in the motion sensor 1 itself, the acceleration "a" or the angular acceleration "α" is generated, and the force caused thereby is applied to each of the polymer sensor elements 11 and 12. Thereby, each of the polymer sensor elements 11 and 12 deforms or bends as illustrated in FIGS. 5B and 5C.

For example, when each of the polymer sensor elements 11 and 12 is deformed or bent in the negative direction on the Y-axis (deformed or bent on the electrode film 42A side), a region on the electrode film 42A side of the highly-polymerized compound film 41 contracts, whereas a region on the electrode film 42B side of the highly-polymerized compound film 41 swells, as illustrated in FIG. 5B. As a result, the cations move toward the electrode film 42B side of the highly-polymerized compound film 41 with a state in which the cations are solvated in the polar solvent, so that the cations are dense on the electrode film 42B side of the highly-polymerized compound film 41, whereas the cations are rough on the electrode film 42A side of the highly-polymerized compound film 41. Hence, the voltages V1 and V2 (positive polarity voltages +V1 and +V2), whose each potential is higher on the electrode film 42B side than on the electrode film 42A side, are generated in the polymer sensor elements 11 and 12, respectively.

In contrast, when each of the polymer sensor elements 11 and 12 is deformed or bent in the positive direction on the Y-axis (deformed or bent on the electrode film 42B side), the region on the electrode film 42B side of the highly-polymerized compound film 41 contracts, whereas the region on the electrode film 42A side of the highly-polymerized compound film 41 swells, as illustrated in FIG. 5C. As a result, the cations move toward the electrode film 42A side of the highly-polymerized compound film 41 with the state in which the cations are solvated in the polar solvent, so that the cations are dense on the electrode film 42A side of the highly-polymerized compound film 41, whereas the cations are rough on the electrode film 42B side of the highly-polymerized compound film 41. Hence, the voltages V1 and V2 (negative polarity voltages −V1 and −V2), whose each potential is higher on the electrode film 42A side than on the electrode film 42B side, are generated in the polymer sensor elements 11 and 12, respectively.

Next, one embodiment will be described where the highly-polymerized compound film 41 includes the ionic liquid, which includes the liquid cation, for the cation substance.

Likewise, when there is no linear motion nor the rotational motion in the motion sensor 1 itself, both the acceleration "a" and the angular acceleration "α" are not generated, and each of the polymer sensor elements 11 and 12 is thus in the planar state with no deformation or bending, as illustrated in FIG. 5A. Thereby, the ionic liquid is dispersed substantially uniformly in the highly-polymerized compound film 41. Hence, the potential difference (i.e., the voltage V1 or the voltage V2) is not generated between the electrode film 42A and the electrode film 42B, and the voltages detected by the voltage detecting sections 151 and 152 are at zero volts.

When there is the linear motion or the rotational motion in the motion sensor 1 itself, the acceleration "a" or the angular acceleration "α" is generated, and thereby, as described above, each of the polymer sensor elements 11 and 12 deforms or bends as illustrated in FIGS. 5B and 5C.

For example, when each of the polymer sensor elements 11 and 12 is deformed or bent in the negative direction on the Y-axis (deformed or bent on the electrode film 42A side), the region on the electrode film 42A side of the highly-polymerized compound film 41 contracts, whereas the region on the electrode film 42B side of the highly-polymerized compound film 41 swells, as illustrated in FIG. 5B. As a result, in one embodiment where the highly-polymerized compound film 41 is a cation exchange membrane, the cations structuring the ionic liquid are movable in the membrane toward the electrode film 42B side of the highly-polymerized compound film 41, but the anions are unable to move due to a functional group hampering those anions. Hence, the voltages V1 and V2 (the positive polarity voltages +V1 and +V2), whose each potential is higher on the electrode film 42B side than on the electrode film 42A side, are generated in the polymer sensor elements 11 and 12, respectively.

In contrast, when each of the polymer sensor elements 11 and 12 is deformed or bent in the positive direction on the Y-axis (deformed or bent on the electrode film 42B side), the region on the electrode film 42B side of the highly-polymerized compound film 41 contracts, whereas the region on the electrode film 42A side of the highly-polymerized compound film 41 swells, as illustrated in FIG. 5C. As a result, the cations in the ionic liquid move toward the electrode film 42A side of the highly-polymerized compound film 41 for a similar reason to that described above. Hence, the voltages V1 and V2 (the negative polarity voltages −V1 and −V2), whose each potential is higher on the electrode film 42A side than on the electrode film 42B side, are generated in the polymer sensor elements 11 and 12.

[Operation and Effect of Motion Sensor 1]

An operation and an effect of the motion sensor 1 as a whole according to this embodiment will now be described.

[1. Basic Operation]

In the motion sensor 1, the linear motion or the rotational motion of the motion sensor 1 itself generates the acceleration "a" or the angular acceleration "α". Each of the polymer sensor elements 11 and 12 is applied with the force derived from the own linear motion or the own rotational motion of the motion sensor 1, thereby causing the polymer sensors 11 and 12 to deform or bend, as illustrated in FIGS. 1 and 5A to 5C.

As a result, the potential difference (the voltages V1 and V2) is generated between the electrode films 42A and 42B in each of the polymer sensor elements 11 and 12. The voltage V1 is detected by the voltage detecting section 151 through the fixed electrodes 131A and 131B and the wirings L1A and L1B, whereas the voltage V2 is detected by the voltage detecting section 152 through the fixed electrodes 132A and 132B and the wirings L2A and L2B. The calculating section 16 detects, for example, each of the acceleration "a" derived from the linear motion along the Y-axis direction and the angular acceleration "α" derived from the rotational motion around the Z-axis (the rotational motion in the X-Y plane) in such manners as illustrated in FIGS. 6A to 7B, based on the thus-detected voltages V1 and V2. In the following, a detecting operation of the acceleration "a" and the angular acceleration "α" will be described.

[2. Detecting Operation of Acceleration "a" and Angular Acceleration "α"]

As illustrated in FIG. 6A, when the motion sensor 1 itself is in the linear motion in the Y-axis direction and the acceleration "a" is thus generated in the positive direction on the Y-axis, each of the polymer sensor elements 11 and 12 deforms or bends in the same direction (in the negative direction on the Y-axis in this embodiment), for example. In other words, in each of the polymer sensor elements 11 and 12, the region on the electrode film 42A side in the highly-polymerized compound film 41 contracts, whereas the region on the electrode film 42B side in the highly-polymerized compound film 41 swells, as illustrated in FIG. 5B. Hence, in one embodiment illustrated in FIG. 6A, the voltages V1 and V2 having the same polarity to each other (i.e, the positive polarity voltages +V1 and +V2) are generated from the polymer sensor elements 11 and 12, respectively.

Figure 7A:
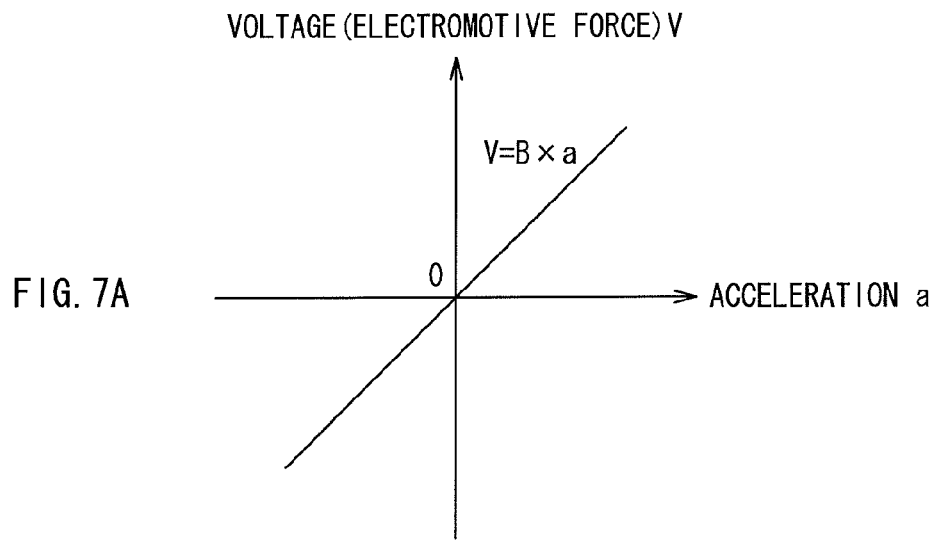
FIG. 7A is a characteristic diagram for describing a relationship between acceleration and a voltage generated in the polymer sensor element.
Figure 7B:
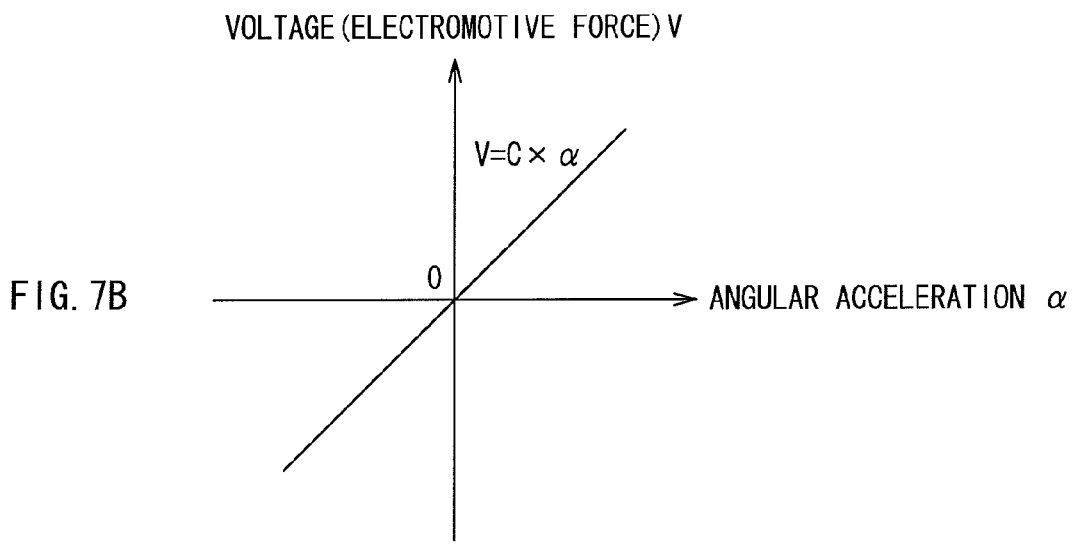
FIG. 7B is a characteristic diagram for describing a relationship between angular acceleration and the voltage generated in the polymer sensor element.

As illustrated in FIGS. 7A and 7B, it is generally known that the voltage (the electromotive force) V generated in the polymer sensor element (the polymer sensor elements 11 and 12 in this embodiment) is proportional to each of the acceleration "a" and the angular acceleration "α". In other words, the voltages V proportional to the acceleration "a" and the angular acceleration "α" are expressed by the following Equations (1) and (2), respectively:

$$V = B \times a \qquad \text{Equation (1)}$$

$$V = C \times \alpha \qquad \text{Equation (2)}$$

where a constant of proportionality for the acceleration "a" is B, and a constant of proportionality for the angular acceleration "α" is C.

Hence, when values of the voltages V1 and V2 here are defined as $(+V1)=(+V2)=A$ (V), the acceleration "a" and the angular acceleration "α" in this case are obtained as expressed by the following Equations (3) and (4), respectively. In other words, the calculating section 16 detects the acceleration "a" based on the sum of the voltage V1 and the voltage V2 (V1+V2), and detects the angular acceleration "α" based on the difference between the voltage V1 and the voltage V2 (V1−V2).

$$(V1+V2)=2A=B\times a \rightarrow a=(2A/B) \qquad \text{Equation (3)}$$

$$(V1-V2)=0=C\times\alpha \rightarrow \alpha=0 \qquad \text{Equation (4)}$$

Thus, the calculating section 16 detects in this case that the acceleration "a" in the positive direction on the Y-axis is generated, and that there is no generation of the angular acceleration "α".

On the other hand, when the motion sensor 1 itself is in the rotational motion around the Z-axis (the rotational motion in the X-Y plane) and the angular acceleration "α" is thus generated in a clockwise direction as illustrated in FIG. 6B, for example, the polymer sensor elements 11 and 12 deform or bend as follows. As illustrated in FIG. 6B, the polymer sensor element 11 is deformed or bent in the negative direction on the Y-axis, whereas the polymer sensor element 12 is deformed or bent in the positive direction on the Y-axis, so that the polymer sensor elements 11 and 12 are deformed or bent in opposite directions to each other. In the polymer sensor element 11, the region on the electrode film 42A side in the highly-polymerized compound film 41 contracts, whereas the region on the electrode film 42B side in the highly-polymerized compound film 41 swells, as illustrated in FIG. 5B. In the polymer sensor element 12, on the other hand, the region on the electrode film 42B side in the highly-polymerized compound film 41 contracts, whereas the region on the electrode film 42A side in the highly-polymerized compound film 41 swells, as illustrated in FIG. 5C. Hence, in one embodiment illustrated in FIG. 6B, the voltages V1 and V2 having the different or reverse polarities to each other (i.e, the positive polarity voltage +V1 and the negative polarity voltage −V2) are generated from the polymer sensor elements 11 and 12, respectively.

Hence, when values of the voltages V1 and V2 here are defined as $(+V1)=A(V)$ and $(-V2)=-A(V)$, respectively, the acceleration "a" and the angular acceleration "α" in this case are obtained as expressed by the following Equations (5) and (6), respectively, as in the Equations (3) and (4) set forth above.

$$(V1+V2)=A-A=0=B\times a \rightarrow a=0 \qquad \text{Equation (5)}$$

$$(V1-V2)=A-(-A)=2A=C\times\alpha \rightarrow \alpha=(2A/C) \qquad \text{Equation (6)}$$

Thus, the calculating section 16 detects in this case that the angular acceleration "α" in the direction illustrated in FIG. 6B, derived from the rotational motion around the Z-axis (the rotational motion in the X-Y plane), is generated, and that there is no generation of the acceleration "a".

According to the embodiment set forth above, the respective first ends of the pair of polymer sensor elements 11 and 12 are fixed while being electrically insulated from each other. Also, the acceleration "a" and the angular acceleration "α" are detected based on the voltage V1 derived from the polymer sensor element 11 and the voltage V2 derived from the polymer sensor element 12, by utilizing a difference in combination of the polarities of the voltages V1 and V2 between the generation of the acceleration "a" and the generation of the angular acceleration "α". Thereby, it is possible to distinguish between the acceleration "a" and the angular acceleration "α" in detection without relying on a complex structure unlike in currently-available techniques. Hence, it is possible to detect a wide variety of motion parameters (in this embodiment, the acceleration "a" and the angular acceleration "α") with a simple configuration.

In other words, it is possible to achieve the motion sensor having a simple yet compact configuration, without relying on a microfabrication process unlike in currently-available techniques. Also, the motion sensor according to the embodiment may be fabricated by cutting a flexible sheet (the sheet having the cross-sectional configuration illustrated in FIG. 3) and combining the cut flexible sheets. Hence, it is possible to keep a manufacturing cost low. Further, it is possible to obtain the acceleration "a" and the angular acceleration "α" only by the simple calculation (the addition and the subtraction) using the voltages V1 and V2, without oscillating the sensor element unlike in currently-available techniques.

[Modifications]

Modifications including a first and a second modification of the embodiment described above will now be described.

Note that the same or equivalent elements as those of the embodiment described above are denoted with the same reference numerals, and will not be described in detail.

[First Modification]

Figure 8A:
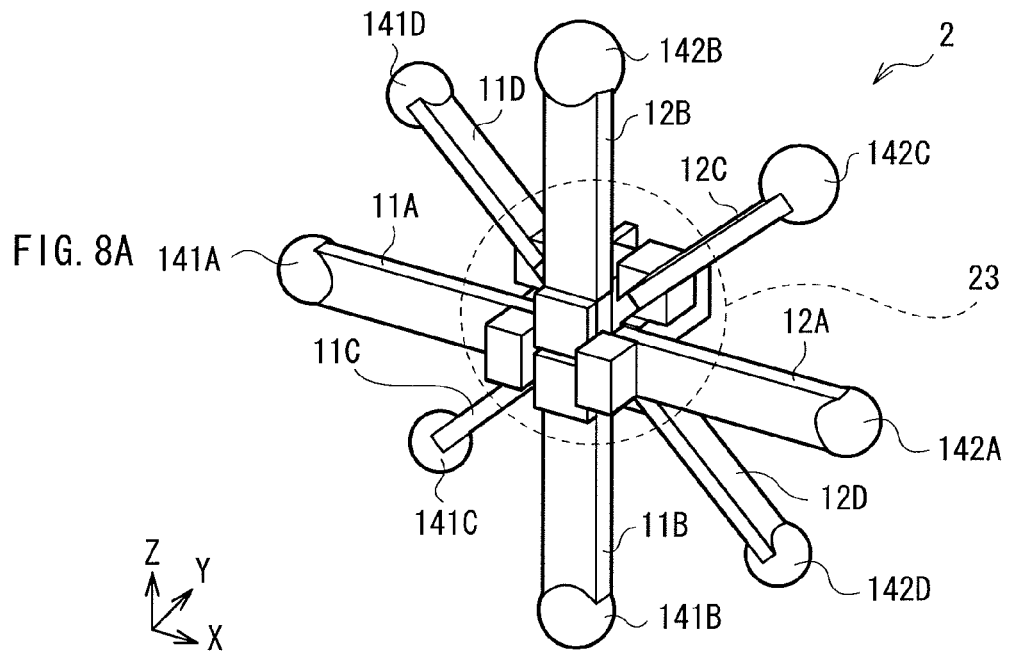
FIGS. 8A and 8B are a perspective view and a plan view, respectively, illustrating an outline of a configuration of a main part of a motion sensor according to a first modification.
Figure 8B:
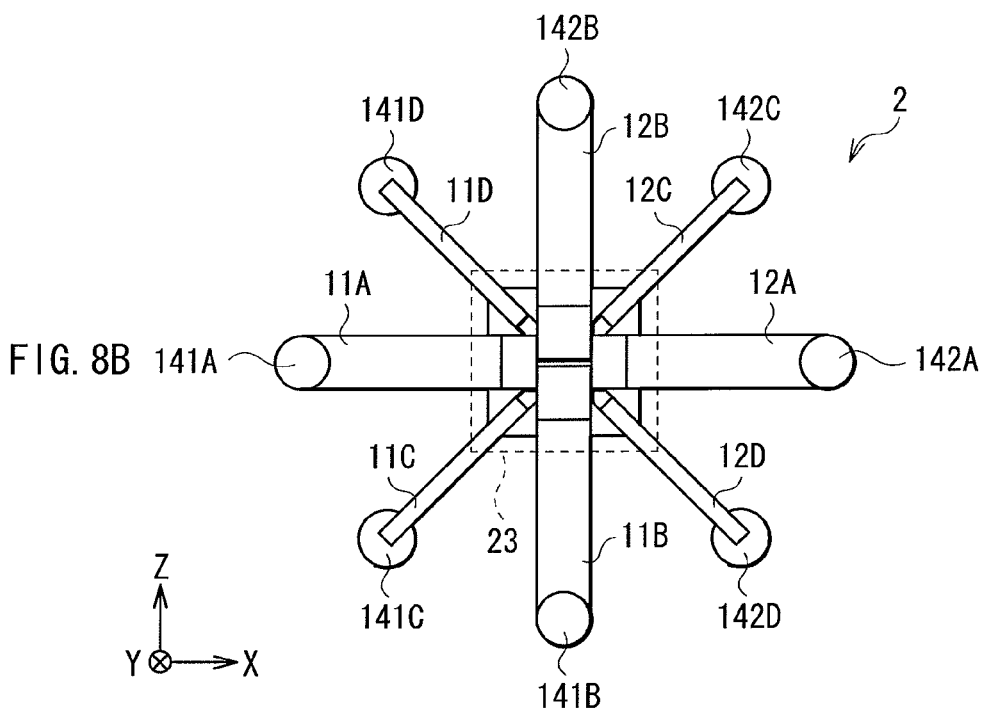

FIGS. 8A and 8B are a perspective view and a plan view in an X-Y plane, respectively, illustrating an outline of a configuration of a main part of a sensor or a "motion sensor 2" according to the first modification. The motion sensor 2 according to the first modification is provided with plural sets (four sets in this modification) of the pair of polymer sensor elements (element pairs) to detect each of the accelerations "a" and the angular accelerations "α" in triaxial directions including the X-axis, the Y-axis, and the Z-axis which are orthogonal to one another. For the purpose of convenience in illustration, elements such as the voltage detecting section and the calculating section are unillustrated in FIGS. 8A and 8B and in later described FIGS. 9A and 9B.

The motion sensor 2 includes a pair of polymer sensor elements 11A and 12A, a pair of polymer sensor elements 11B and 12B, a pair of polymer sensor elements 11C and 12C, and a pair of polymer sensor elements 11D and 12D. Respective first ends of the polymer sensor elements 11A to 11D and 12A to 12D are so fixed by a common fixing member 23 that the polymer sensor elements 11A to 11D and 12A to 12D form two sets of cross configurations each having an inclination of 45 degrees with respect to one another. Second ends of the polymer sensor elements 11A to 11D and 12A to 12D are provided with weights 141A to 141D and 142A to 142D, respectively.

With this configuration, the motion sensor 2 detects the acceleration "a" in the Y-axis direction and the angular acceleration "α" around the Z-axis using the pair of polymer sensor elements 11A and 12A, and likewise detects the acceleration "a" in the Y-axis direction and the angular acceleration "α" around the X-axis using the pair of polymer sensor elements 11B and 12B. Also, the motion sensor 2 detects the accelerations "a" in the X-axis direction and in the Z-axis direction and the angular acceleration "α" around the Y-axis using the pair of polymer sensor elements 11C and 12C, and likewise detects the accelerations "a" in the X-axis direction and in the Z-axis direction and the angular acceleration "α" around the Y-axis using the pair of polymer sensor elements 11D and 12D.

Thus, the motion sensor 2 according to the first modification is capable of detecting each of the accelerations "a" and the angular accelerations "α" in the triaxial directions including the X-axis, the Y-axis, and the Z-axis which are orthogonal to one another with a single module, using the sensor elements (four pairs of the polymer sensor elements in this modification) which are less in number than those according to currently-available techniques.

[Second Modification]

Figure 9A:
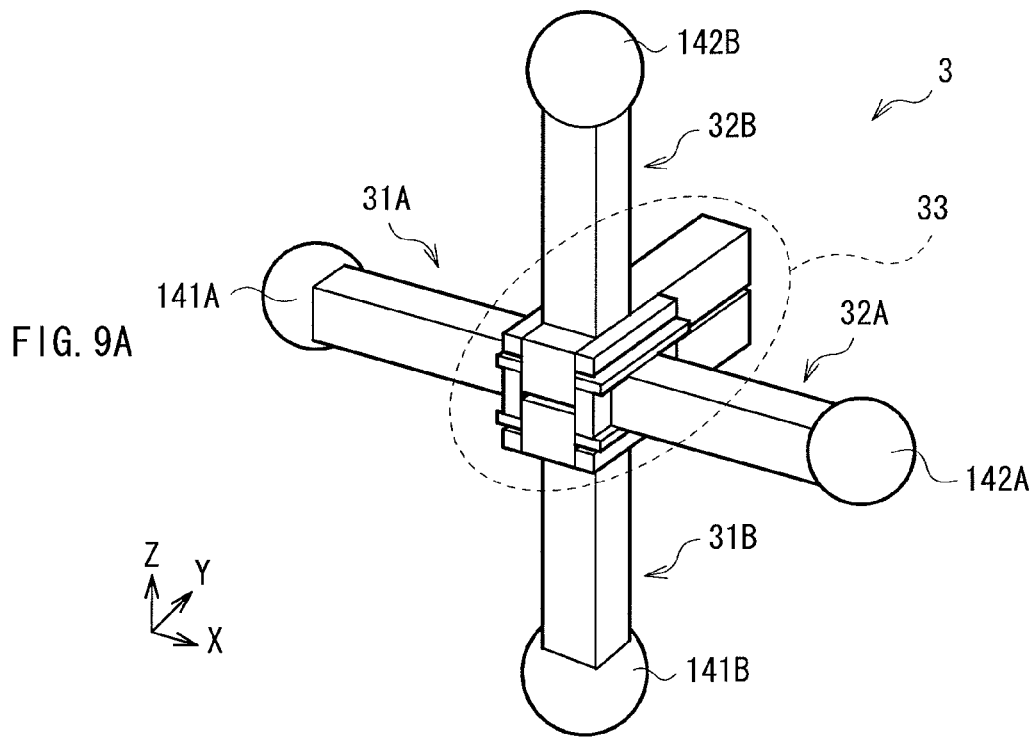
FIGS. 9A and 9B are a perspective view and a plan view, respectively, illustrating an outline of a configuration of a main part of a motion sensor according to a second modification.
Figure 9B:
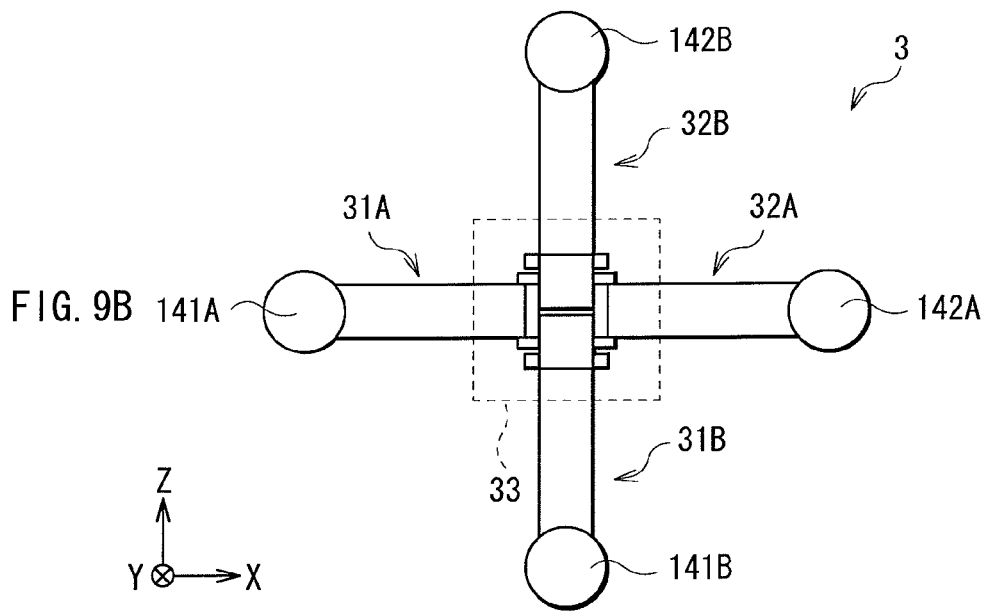

FIGS. 9A and 9B are a perspective view and a plan view in an X-Y plane, respectively, illustrating an outline of a configuration of a main part of a sensor or a "motion sensor 3" according to the second modification. The motion sensor 3 according to the second modification is provided with plural sets (two sets in this modification) of the pair of polymer sensor elements (elements pairs) to detect each of the accelerations "a" and the angular accelerations "α" in triaxial directions including the X-axis, the Y-axis, and the Z-axis which are orthogonal to one another.

The motion sensor 3 includes a pair of polymer sensor elements 31A and 32A, and a pair of polymer sensor elements 31B and 32B. Respective first ends of the polymer sensor elements 31A, 31B, 32A, and 32B are so fixed by a common fixing member 33 that the polymer sensor elements 31A, 31B, 32A, and 32B form a cross configuration. Second ends of the polymer sensor elements 31A, 31B, 32A, and 32B are provided with the weights 141A, 141B, 142A, and 142B, respectively.

In the second modification, each of the polymer sensor elements 31A, 31B, 32A, and 32B has a rectangular structure, and four side faces of each of the rectangular structures are each provided with the fixed electrode. Each of the polymer sensor elements 31A, 31B, 32A, and 32B utilizes the four fixed electrodes thereof to be able to deform or bend along two directions which are orthogonal to each other. In this modification, each of the polymer sensor elements 31A and 32A is capable of deforming or bending along the Y-axis direction and the Z-axis direction. Also, each of the polymer sensor elements 31B and 32B is capable of deforming or bending along the X-axis direction and the Y-axis direction. Thereby, each of the polymer sensor elements 31A and 32A is capable of detecting the accelerations "α" in the biaxial directions and the angular accelerations "α" around the biaxial directions, and each of the polymer sensor elements 31B and 32B is also capable of detecting the accelerations "α" in the biaxial directions and the angular accelerations "α" around the biaxial directions.

Thus, the motion sensor 3 according to the second modification is capable of detecting each of the accelerations "a" and the angular accelerations "α" in the triaxial directions including the X-axis, the Y-axis, and the Z-axis which are orthogonal to one another, using the sensor elements (two pairs of the polymer sensor elements in this modification) which are further less in number than those according to the first modification described before.

[Other Modifications]

Although the invention has been described in the foregoing by way of example with reference to the embodiment and the modifications, the invention is not limited thereto but may be modified in a wide variety of ways.

For example, in the embodiment and the modifications, the second end of each of the polymer sensor elements is provided with the weight. However, the weights may not be provided.

Shapes and stack configurations of the polymer sensor elements are not limited to those described in the embodiment and the modifications, and may be appropriately modified.

The sensors or the motion sensors according to the embodiment and the modifications are applicable to any electronic devices including, for example but not limited to, mobile phones, gaming consoles, and gaming machines.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A sensor, comprising:
   a first polymer sensor element configured to generate a first voltage in response to a deformation thereof;
   a second polymer sensor element configured to generate a second voltage in response to a deformation thereof;
   a fixing member fixing a first end of each of the first and the second polymer sensor elements while electrically insulating the first polymer sensor element from the second polymer sensor element, wherein the fixing member includes a first insulating section provided between a first upper fixed electrode and a second upper fixed electrode each being connected to a front side of the first and the second polymer sensor elements, respectively, and a second insulating section provided between a first lower fixed electrode and a second lower fixed electrode each being connected to a back side of the first and the second polymer sensor elements, respectively;

a weight attached to a second end of each of the first and the second polymer sensor elements; and a detector detecting an acceleration and an angular acceleration based on the first voltage derived from the first polymer sensor element and the second voltage derived from the second polymer sensor element.

2. The sensor according to claim 1, wherein the detector detects the acceleration based on a sum of the first voltage and the second voltage, and detects the angular acceleration based on a difference between the first voltage and the second voltage.

3. The sensor according to claim 1, wherein a plurality of element pairs, each including the first and the second polymer sensor elements, are so fixed by the common fixing member that the plurality of element pairs form a cross configuration, and the detector detects the accelerations and the angular accelerations in each of triaxial directions which are orthogonal to one another, based on the first voltages and the second voltages derived from the plurality of element pairs.

4. The sensor according to claim 1, wherein the weight is configured of a resin material containing a heavy metal.

5. The sensor according to claim 1, wherein each of the first and the second polymer sensor elements includes:

a pair of electrode films; and a polymer film inserted between the pair of electrode films.

6. The sensor according to claim 5, wherein the polymer film comprises an ion-conductive highly-polymerized compound film impregnated with a cation substance.

* * * * *